March 5, 1963 L. W. SPEAKER 3,079,767
WATER ENTRAINMENT MEANS FOR AIR CONDITIONING APPARATUS
Filed June 21, 1961 2 Sheets-Sheet 1
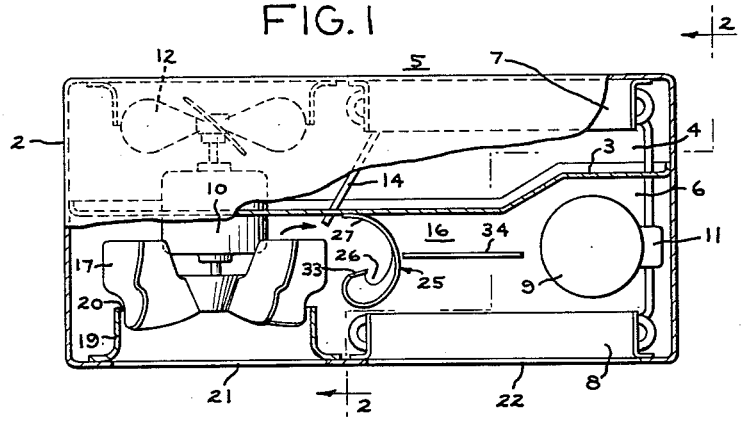
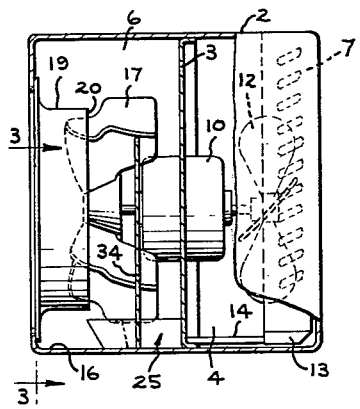
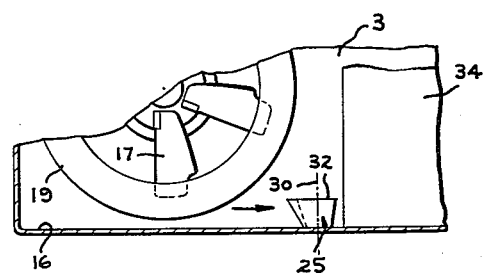
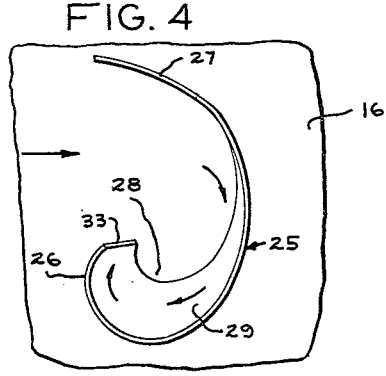
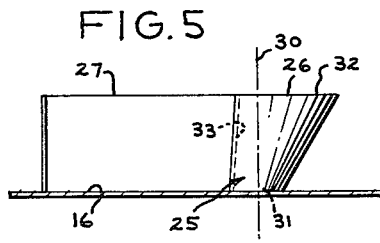
*INVENTOR.*
LAWRENCE W. SPEAKER
BY 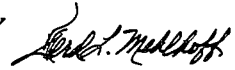
HIS ATTORNEY March 5, 1963 L. W. SPEAKER 3,079,767
WATER ENTRAINMENT MEANS FOR AIR CONDITIONING APPARATUS
Filed June 21, 1961 2 Sheets-Sheet 2
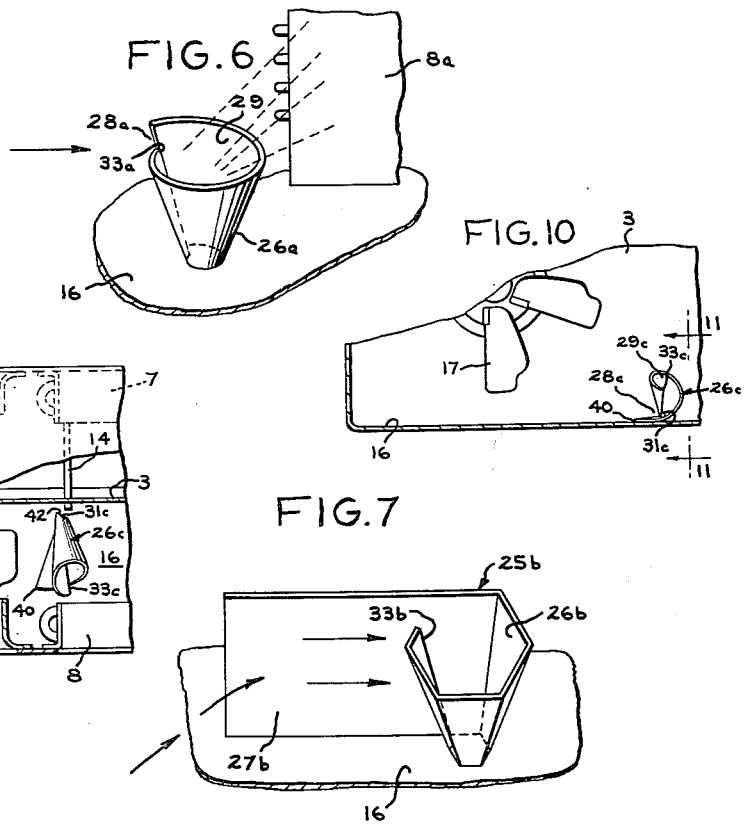
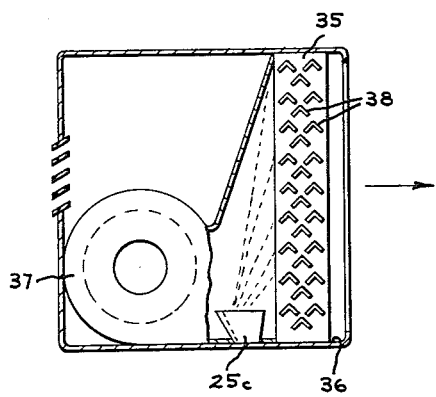
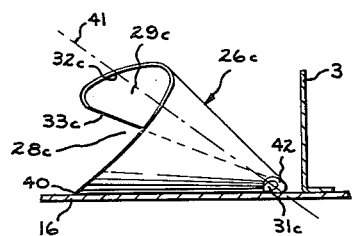
INVENTOR.
LAWRENCE W. SPEAKER
BY
HIS ATTORNEY

United States Patent Office 3,079,767
Patented Mar. 5, 1963

3,079,767
WATER ENTRAINMENT MEANS FOR AIR
CONDITIONING APPARATUS
Lawrence W. Speaker, Louisville, Ky., assignor to General Electric Company, a corporation of New York
Filed June 21, 1961, Ser. No. 118,731
9 Claims. (Cl. 62—280)

The present invention relates to apparatus for entraining liquid droplets in an air stream and is particularly well adapted for use in air conditioning devices in which water to other liquid must be entrained in an air stream circulated through the device in order to dispose of the water or to utilize the water for other purposes.

Self-contained air conditioning units, or room air conditioners, are usually provided with two heat exchangers, one located within an inner compartment of the unit and exposed to indoor air, and the other located in an outer compartment and exposed to outdoor air. A pair of fans are usually provided in the unit for circulating separate streams of air from the enclosure and from the outdoors respectively over these heat exchangers in the inner and outer compartments. In some of these units the refrigeration system is reversible for heating or cooling air circulated from the enclosure.

Moisture from the air stream being circulated over the cooling unit, or heat exchanger being operated as an evaporator, condenses onto the coils of this heat exchanger and creates a water disposal problem. A condensate collection sump is normally positioned within the outer compartment of the conditioning unit and means are provided beneath the respective heat exchangers for collecting condensate water, which forms thereon, and for delivering it to the condensate collection sump. In order to dispose of this condensate water collecting within the sump many conditioners employ a slinger ring which is attached to and surrounds the periphery of the fan in the outer compartment The slinger ring extends or dips into the condensate water in the sump and during rotation of the fan throws the water out of the sump onto the other components of the outer compartment; and preferably onto the heat exchanger in the outer compartment.

The above type of slinger ring has inherent disadvantages especially when used in those air conditioners adapted for operation during both summer and winter seasons. That is, in these air conditioners, the condensate water in the outer compartment is likely to freeze during the cold winter months, and in such a case, the fan is prevented from rotating by the ice around the slinger. This either causes the fan motor to overheat or results in some other serious damage to the mechnical parts of the unit. It is desirable, therefore, in these types of units designed for use throughout the year to provide some other means for disposing of the condensate water and preferably some means not having moving parts likely to become frozen into ice forming in the condensate sump.

It should be noted that, while the present invention is particularly well suited for use in disposing of condensate water in air conditioners, it is also useful in any type of device in which it is desirable to spray water by means of a circulating air stream. For example, the present invention is easily adapted for use in evaporative type coolers through which air from an enclosure is circulated and wherein some means are required for spraying water onto an evaporative cooling device.

It is an object of the present invention to provide an improved apparatus for entraining water droplets in an air stream.

Another object of the present invention is to provide an improved apparatus adapted for spraying water out of a receptacle by means of an air stream circulated over the receptacle.

It is a further object of the present invention to provide an improved arrangement for lifting condensate water droplets from a condensate sump in an air conditioner and entraining these droplets in an air stream being circulated through the conditioner.

It is a more specific object of the present invention to create a stabilized air vortex having a low pressure area communicating with liquid in a receptacle for elevating liquid droplets from the receptacle and entraining them in an air stream flowing thereover.

Further objects and advantages of the invention will become apparent as the following description proceeds, and the features of novelty which characterize the invention will be pointed out with particularity in the claims annexed to and forming a part of the specification.

In carrying out the objects of the present invention, there is provided within an appliance, a means for circulating an air stream through the appliance. Arranged in the path of the air stream is an air vortex generating member including an eye section in the path of the air stream and adapted to receive through an opening in the eye section at least a portion of the air stream flowing through the appliance. The eye section includes an inner wall shaped to impart a swirling motion to the deflected air stream. The inner wall of the eye section is also inclined from a relatively small opening at one end of the eye section to a larger opening at the other end thereof so that the wall imparts a thrust to the air stream in the direction of the larger opening and discharges the swirling air stream from the larger opening thereby generating a stabilized air vortex having a low pressure region in the center of the eye section and communicating with the eye section. Means are provided within the apparatus for introducing liquid into the eye section so that the liquid is drawn into the low pressure area and broken up into small droplets by the turbulence of the swirling air vortex to become entrained in the air flowing upwardly therefrom.

As a further aspect of the present invention, the air vortex generator is disposed in the condensate sump of an air conditioner over which an air stream is circulated and so arranged within the sump that the trailing edge of the inner wall of the eye section is directed in a predetermined direction, such as in the direction of the condenser, so that water blown around the surface of the inner wall of the eye section is sprayed from the trailing edge of the inner wall in this predetermined direction.

For a better understanding of the invention reference may be had to the accompanying drawings in which:

FIG. 1 is a plan view partially in cross section of an air conditioner having the water entrainment arrangement of the present invention;

FIG. 2 is an elevation view taken along line 2—2 of FIG. 1 showing the air vortex generator disposed in the bottom of a condensate sump and extending upwardly into the air stream flowing over the sump;

FIG. 3 is an elevation view taken along line 3—3 of FIG. 2 and illustrating the relative positions of the fan in the outer compartment and the air vortex generator;

FIG. 4 is an enlarged plan view illustrating the preferred form of the vortex generator;

FIG. 5 is an enlarged elevation view taken from the upstream side of the vortex generator;

FIG. 6 is a perspective view of an air vortex generator having no appreciable deflector section;

FIG. 7 is a perspective view of another embodiment of the air vortex generator;

FIG. 8 is an elevation view of an evaporative type air conditioner incorporating an air vortex generator for spraying water on an evaporative cooling unit;

FIG. 9 is a partial plan view of an air conditioner incorporating another embodiment of the invention;

FIG. 10 is an elevation view taken from the front of the air conditioner illustrated in FIG. 9 with the orifice portion removed to disclose the relative positions of the fan and the air vortex generator; and FIG. 11 is an enlarged elevation view of the air vortex generator taken along line 11—11 of FIG. 10 on the downstream side of the vortex generator.

Refering now to FIG. 1, there is shown an air conditioner of the reversible flow type which is arranged to be positioned within an opening in an enclosure. The unit comprises a casing 2 divided by a barrier 3 into an inner compartment 4 and an outer compartment 6 in which there are mounted respectively an indoor heat exchanger 7 and an outdoor heat exchanger 8. The heat exchangers 7 and 8 are connected in refrigerant flow relationship with a compressor 9, also positioned in the outer compartment 7. In the illustrated embodiment of the invention, the refrigeration system is provided with a reversing valve 11 which may be selectively operated to reverse the flow of refrigerant to the heat exchanger units 7 and 8 in order to heat or cool the respective air streams circulated over these heat exchangers.

When the conditioner is in operation, air is drawn from within the room, designated by reference numeral 5, and circulated by an air moving means or fan 12 through the inner compartment 4 of the conditioner and passed over the heat exchanger 7. The fan 12 is driven by a motor 10 mounted in the barrier 3. During operation of the unit on the cooling cycle, the heat exchanger 7 is operated as an evaporator and moisture from the air stream being circulated over the heat exchanger 7 is condensed onto the coil surfaces of the heat exchanger 7. Means are provided for collecting this condensate water and delivering it to a water receptacle or condensate collection sump 16 formed in the base of the unit in the base of the unit in the outer compartment 6 of the air conditioner. More specifically, these means include a suitable drip tray 13 (seen best in FIG. 2) from which condensate water is delivered to the sump 16 through means of an insulated conduit 14.

When the air conditioning unit is operated on the cooling cycle, the outdoor heat exchanger 8 is operated as a condenser and is cooled by the outdoor air being circulated thereover. When the unit is operating on the heating cycle, the reversing valve 11 reverses the flow of refrigerant to the heat exchangers 7 and 8 thereupon utilizing the heat exchanger 7 as a condenser and heat exchanger 8 as an evaporator. It will be noted that, during the heating cycle, the outer compartment heat exchanger 8, which is then operating as an evaporator, condenses moisture out of the outside air. Condensate water drips from the heat exchanger 8 into the bottom of the outer compartment 6 and is thereby delivered to the condensate collection sump 16 formed in the bottom of the compartment 6.

As may be seen in FIG. 1, the condensate sump 16 forms the bottom of the casing in the outer compartment. It is to be noted that the water receptacle or sump 16 may take on any desirable form and is, of course, not limited to the arrangement wherein the water receptacle forms the entire bottom portion of the condenser compartment of an air conditioner. It is important, however, that the air moving means for circulating air through the outer compartment be disposed so that it circulates at least a portion of the air stream in a direction substantially parallel with and over the surface of the liquid or water in the receptacle 16. More specifically, as may best be seen in FIGS. 1 and 3, the air moving means or outdoor fan 17 draws air inwardly through the inlet opening 21 and the orifice opening 20. The outdoor air flows inwardly against the barrier 3 and is diverted radially by the fan and the barrier into the remaining portions of the outer compartment 6. In the embodiment of the invention shown, the fan 17 is a mixed flow fan in which the air is propelled rearwardly by the forward portions of the fan and turned within the fan to be propelled in a direction normal to the axis of the fan. As may best be seen in FIG. 3, the mixed flow fan 17 circulates a stream of air along the surface of the water in the sump 16 and this air stream, as will hereinafter be described, aids in the entrainment of water droplets from the sump 16 into the air stream flowing through the outer compartment. This air stream flows through the remaining portions of the outer compartment 6, over the heat exchanger 8 and is then discharged to the outdoors through the outlet opening 22. It should be noted that, while a mixed flow fan creates a great deal of radial air flow, this is also true of the normal axial flow fan and such a fan could easily be used as long as a portion of the air stream discharging therefrom passes over the surface of the condensate sump 16.

In order to dispose of condensate water collecting in the water receptacle or condensate collection sump 16, the present invention incorporates an air vortex generator 25 which is designed to receive or trap a portion of the air stream circulating through the outer compartment and impart a swirling motion and as well as a thrust to this swirling air mass in an angular direction with respect to the original direction of air flow thereby creating a relatively stable air vortex discharging from the generator. As may be seen in FIGS. 1, 2 and 3, the air vortex generator 25 of the present invention extends upwardly from the receptacle or condensate sump 16 into the path of the air stream flowing thereover. Referring now to FIGS. 4 and 5, it can be seen that the generator 25 includes an eye section, generally designated by the reference numeral 26, and a diverter section 27 attached to the eye section and adapted to divert a portion of the air stream into the eye section. In the embodiment illustrated in FIGS. 4 and 5, the diverter section comprises an upright tail or curved portion extending from and attached to the eye section 26. Air is diverted by the diverter section 27 into the eye section 26 through the gap or slot 28 between the inner wall 29 and the reversely turned trailing edge 33 of the eye section.

As may best be seen in FIGS. 4 and 5, the eye section includes an inner wall or inner surface 29, that is inclined at an angle from one end of the eye section 26 to the other end thereof. The inclined inner wall 29 is reversely bent or turned upon itself to form a loop, or structure having a substantially C-shaped cross-section. It will be noted that the edge 33 of the wall does not completely close the loop and thus forms the gap 28 through which air is diverted into the eye section.

It will also be noted in the embodiment illustrated in FIGS. 1–5 that, because of the incline or slant of the wall 26, the wall defines a relatively small opening 31 in the bottom thereof and is gradually flared or increases to a somewhat larger opening 32 at the top thereof.

In the embodiment of the invention illustrated in FIGS. 4 and 5, the air vortex generator comprises a thin upright panel member having one end, or the eye section, formed into a substantially C-shaped cross-section or spiral shape and having the diverter section 27 curved into the air stream to sweep the air around a smooth path so that it flows tangentially along the inner wall surface of the tightly curved or C-shaped eye section 26 of the generator. The inner wall surface 29 confines the diverted or trapped air stream into a substantially circular path and the incline of the wall imparts an upward thrust to the air stream. It is to be understood that, when the fan 17 is operated, a continual stream of air is diverted into the eye section 26 by the diverter section 27 and this air stream is continually swirled and given an upward thrust by the eye section 26 of the generator thereby creating an air vortex or swirling air mass, which is somewhat stabilized in nature above the general area of the eye section of the generator.

It will also be noted in FIGS. 3 and 5, that the axis of rotation 30 of this whirling mass is substantially vertical or at an angle substantially perpendicular with the surface of the receptacle and the lower portion of this swirling air mass extends into the eye section and communicates with the relatively small opening 31 in the bottom of the eye section. The swirling air mass is discharged from the larger opening 32 and flows upwardly into the air stream blown by the fan 17 and eventually is mixed with this air stream to be circulated over the outer heat exchanger 8 and then discharged from the compartment.

In the specification and the claims annexed hereto the openings in the bottom and top of the eye section are described respectively as a relatively small opening 31 and a larger opening 32. By small opening and large opening applicant merely means that the opening 31 at the bottom of the eye section is necessarily smaller than the opening 32 at the top because of the flared shape or outward slant of the inner wall 29. The particular size of the openings is unimportant as long as this relationship is understood.

It will be noted that the air vortex of FIG. 4 is provided with a gradually reducing radius of curvature for the inner wall 29 of the eye section. This tends to increase the rotational velocity of the air stream flowing around the inner wall as the motion of the diverted air stream is changed from a translational motion to a rotational motion. It is believed that the centrifugal force, produced by the rapid change in the diverted air stream from the translational motion to rotational motion, creates a reduced pressure region in the center of the vortex or swirling air mass which extends into the relatively small opening 31 at the bottom of the eye section 26 of the generator. Inasmuch as the opening 31 is arranged in the bottom of the sump 26, the lower portion of the eye section 26 always contains water whenever there is water in the sump. It is believed that the low pressure region created in the center of the vortex causes the water to be lifted from the sump upwardly into the vortex somewhat as a tornado lifts an object in its path. This water is then rotated by the air mass and the turbulence of the air mass atomizes the water into small droplets which are then carried by the upwardly flowing vortex into the air stream flowing through the outer compartment. The water droplets are then carried into the remaining portions of the outer compartment and specifically onto the condenser or outdoor heat exchanger 8 of the unit.

The vortex generator also operates in another manner to entrain water droplets into the air stream. When the vortex generator is mounted on the bottom surface of the sump, it is constantly in contact with water in the sump. The centrifugal force of the rotating air mass in the eye section forces water to flow upwardly along the inclined surfaces of the inner annular wall 29 and causes water to flow along the surface 29 toward the trailing edge 33 of the inner wall of the eye section as the air stream is confined therein. Water collects on the trailing edge 33 of the eye section and is blown off or carried off of the edge 33 in a fine spray by the air mass as it discharges from the eye section. Because of the slant of the inner wall, the air stream flowing over the edge 33 is moving in an upward direction and this causes water to spray in a generally upward direction. This is further increased by constructing the eye section so that the edge 33 points or slants in a generally upward direction and therefore sprays water tangentially therefrom. By directing this edge 33 at any desired object, such as at the condenser or outdoor heat exchanger 8, it is possible to discharge this spray of water in the general direction of the object toward which the edge 33 faces. That is, it is possible to spray water from the eye section along a plane generally tangent to the inner wall surface 29 at the edge 33 of the eye section. An object intercepting this plane such as the condenser or heat exchanger 8 will, of course, be in the path of this water spray. In the embodiment of the invention disclosed in FIGS. 1–5, the edge 33 is directed at an upright panel 34. Water sprayed onto the panel 34 splashes off of the panel and is carried by the air stream onto the outdoor heat exchanger 8. Although the panel 34 is not believed to be absolutely essential, inasmuch as the air stream circulated through the outer compartment must discharge through the heat exchanger 8 and carries water entrained therein with it, it does serve to confine the water spray to the rear or outwardly disposed portions of the outer compartment 6.

It will be understood that the vortex generator need not have precisely the shape of the generator illustrated in FIGS. 1–5. For instance, it has been found unnecessary in all cases to provide a relatively long curved diverter section 27, as shown in the preferred embodiment of the air vortex generator of FIGS. 1–5. FIG. 6, for example, illustrates an air vortex generator in which the diverter section is all but eliminated. In FIG. 6, the gap 28a in the eye section 26a is positioned to receive air directly from the air stream. Air entering the gap 28a is confined by the inclined wall surface 29 and rotated within the annular eye section 26a. Water droplets are raised out of the receptacle by this whirling air mass and carried upwardly from the generator. As may be seen in FIG. 6, water is also sprayed from the edge 33a, onto a condenser or heat exchanger designated by the reference numeral 8a. Because the water is sprayed in the upward direction and at an angle with respect to the direction of air stream circulating above the vortex generator it is fairly uniformly spread over most of the condenser surface.

Still another form of the vortex generator is shown in FIG. 7. In this embodiment, the inner wall surface of the eye section 26b assumes an angular shape and connects with a straight panel member 27b forming the diverter section. The inner wall surface of the eye section confines the diverted air stream around a substantially closed path and, because the inner wall surface is inclined outwardly from the bottom of the eye section to the top, an upward thrust is also imparted to the whirling air mass. While the construction of FIG. 7 is not believed to be the most desirable shape, it does produce a stabilized air vortex capable of lifting water droplets out of a receptacle or spraying water droplets off the edge 33b of the device. It should be noted, therefore, that the present invention is not limited to an annular or smoothly curved structure, but is believed to include any arrangement wherein the confining wall surface of the generator is at least partially looped or spiralled and develops a mass of swirling air having an axis of rotation at an angle with respect to the direction of the flow of the original air stream. Thus, in FIG. 7, the direction of the original air stream is horizontal or parallel with the receptacle 16 while the axis of rotation of the air vortex is substantially perpendicular to this direction of air flow.

Referring now to FIG. 8, there is shown in somewhat schematic form an arrangement for utilizing an air vortex generator within an air conditioner of the evaporative type. In this air conditioner, water is sprayed onto an evaporative cooling unit 35 through which an air stream is circulated and cooled by evaporation of the water. In the embodiment shown, the vortex generator 25c is arranged in the path of the air stream being discharged from a blower unit 37. The vortex generator is disposed in the bottom of the unit within the receptacle 36 into which water is supplied. The blower 37 circulates a stream of air generally parallel to the bottom surface of the receptacle 36 and at least a portion of this air stream is trapped or diverted into the vortex generator 25c. In the same manner as previously described above, the vortex generator 25c sprays water into the upper portions of the unit where it is entrained in the air stream circulated therethrough and carried onto the evaporative unit 35.

The air stream circulating through this evaporative section 35 is then cooled by the evaporation of the water and passed from the unit into the enclosure to be conditioned. Suitable water baffles 38 are provided in the evaporative unit 35 which collect the unevaporated water droplets and drain the water back into the receptacle 36 where it then flows back into the area of the vortex generator 25c to be again thrown onto the evaporative unit 35. Water, of course, continually evaporates in this type of cooler and must, after a period of operation, be replenished by the operator or by other means, such as a valve controlled water supply conduit.

Referring now to FIGS. 9, 10 and 11 there is shown another embodiment of the invention utilizing an air vortex generator substantially similar to that shown in FIG. 6 except that the generator is leaned over or tilted at an angle with respect to the bottom of the receptacle 16. More specifically the air vortex generator or eye section comprises an eye section 26c, which is a thin wall member or panel 29c having its front or forward edge 40 arranged in abutting relationship or substantially flush with the bottom of the receptacle 16. The thin panel is curved upwardly with the concave portions of the panel facing into the air stream so that the curved panel generates a substantially spiral or involute-shape about an axis 41 disposed at an acute angle with respect to the surface or bottom of the receptacle 16. The gap 28c or concave opening in the eye section 26c is positioned to receive air from the air stream flowing over the bottom of the receptacle 16. Air entering the gap 28c is confined by the curved or spiral-shaped wall surface 29c and given a swirling motion by the shape of the wall.

It will be noted that the wall 29c of the eye section is inclined or flared from one end thereof to the other end thereby defines a relatively small opening 31c at the one end thereof which gradually increases to a larger opening 32c at the other end thereof. The inner wall surface 29c confines the diverted or trapped air stream into a substantially circular or spiral path and the incline or slant of the wall 29c imparts a thrust to the air stream in a direction toward the larger opening 32c. It will be understood that, when the fan 17 is operated, a continual stream of air is diverted into the gap 28c of the eye section 26c and this air stream is continually swirled and given an outward thrust by the eye section 26c of the generator thereby creating a substantially stabilized air vortex or swirling air mass discharging at an angle substantially along the axis 41 of the eye section.

As in the previously disclosed arrangements, the centrifugal force, produced by the rapid change from the translational motion to rotational motion by the diverted air stream, creates a reduced pressure region in the center of the vortex or swirling air mass which extends into the relatively small opening 31c at the bottom of the eye section 26c. The opening 31c is arranged so that it is adjacent the bottom of the receptacle 16 and is, therefore, in communication with water whenever there is water in the sump. More specifically, it will be seen that there is an extension 42 of the upstream side of the wall 29c which covers the opening 31c on the upstream side thereof. This prevents the air stream discharging from the fan 17 from blowing water away from the opening 31c in the vortex generator and permits water to enter the generator from the downstream direction. Because of the high pressure adjacent the bottom of the receptacle beneath the fan 17, water is generally blown away from the area closely adjacent this portion of the condensate sump 16. However, because the opening 31c is protected by the extension 41 of the wall 29c of the eye section 26c of the vortex generator, water flows through the opening 31c from the downstream portions of the sump 16. Water enters the vortex generator through the small opening 31c and it is believed that the low pressure region created in the center of the vortex causes the water to be lifted from the sump upwardly into the vortex somewhat as a tornado lifts objects in its path. The vortex then breaks the water up into small droplets which are thrown outwardly with the air stream being discharged from the larger opening 32c. These water droplets are then mixed with and carried by the original air stream into other portions of the outer compartment.

It will also be noted that the rear edge 33c of the wall or panel 29c, in the embodiment disclosed in FIGS. 9, 10 and 11, is substantially parallel or is substantially tangential with respect to the original direction of the air stream flowing over the receptacle 16. A portion of this edge 33c of the panel 29c projects slightly outward beyond the larger opening 32c so that water sprays from this edge in the direction of the air stream flowing through the unit. More specifically, the centrifugal force of the rotating air mass in the eye section 26c causes at least a portion of the water drawn through the opening 31c to flow around the inclined surfaces of the panel or inner annular wall 29c toward the trailing edge 33c of the panel. Water collects on the trailing edge 33c of the panel and is blown off or carried off of the edge 33c in a fine spray by the air mass as it discharges from the eye section. The water droplets spraying off the edge 33c are then carried by the air stream into the other portions of the unit, such as onto the condenser 8, or carried by the air stream as it discharges out of the unit.

While in accordance with the patent statutes there has been shown and described what at present is considered to be the preferred embodiments of this invention, it will be obvious to those skilled in the art that various changes and modifications may be made therein without departing from the invention, and it is, therefore, the intent of the appended claims to cover all such changes and modifications as fall within the true spirit and scope of the invention.

What I claim as new and desire to secure by Letters Patent of the United States is:

1. In an air conditioning apparatus utilizing a liquid spray on a heat exchange device for cooling purposes, the combination comprising a liquid receptacle in said apparatus, means for delivering liquid to said receptacle, air circulating means arranged to circulate an air stream through said apparatus, said air circulating means so arranged as to circulate said air stream along the surface of said liquid in said receptacle, a heat exchanger arranged downstream from said liquid receptacle through which said air stream circulates, an air vortex generating member extending upwardly from said liquid in said receptacle into said air stream being circulated thereover, said air vortex generating member including an eye section having a gap therein adapted to receive at least a portion of said air stream and an inner wall surface so constructed and arranged as to confine said air stream to a substantially circular path, said inner wall surface being inclined from a small opening at the bottom of said eye section to a large opening at the top thereof so that said wall imparts an upward thrust and a swirling motion to said air stream to create a substantially stabilized air vortex flowing generally upwardly from said eye section and having a low pressure region in the center thereof, said small opening in the bottom of said eye section communicating with liquid in said receptacle so that said liquid in said receptacle is drawn into said low pressure region of said air vortex and broken up into small droplets by said air vortex to become entrained in said air flowing upwardly from said eye section.

2. In an air conditioning apparatus including a cooling unit adapted to remove water from an air stream being circulated therethrough, the combination comprising a water receptacle, means for collecting water from said cooling unit and delivering said water to said receptacle, air circulating means arranged to circulate an air stream along the surface of said water in said receptacle, an air vortex generating member arranged in the path of said air stream circulating over said water, said vortex generating member including an eye section having a gap therein adapted to receive at least a portion of said air stream and having an inner annular wall so constructed and arranged as to confine said air stream to a substantially circular path within said eye section, said inner annular wall forming relatively small opening in the bottom of said eye section and slanting outwardly around all portions of said eye section to form a larger opening at the top thereof so that said inner annular wall imparts an upward thrust to said swirling air stream entering said eye section thereby generating a substantially stabilized air vortex having a low pressure region in the center thereof and flowing generally upwardly from said eye section, said eye section communicating with water in said receptacle so that water is drawn into said eye section by said low pressure region of said air vortex and broken up into small droplets by said air vortex to become entrained in said air stream flowing upwardly from said eye section.

3. In an air conditioning apparatus utilizing a liquid spray on a heat exchange device for cooling purposes, the combination comprising a liquid receptacle in said apparatus, means for delivering liquid to said apparatus, air circulating means in said apparatus arranged to circulate an air stream therethrough, said air circulating means so disposed with respect to said liquid receptacle as to circulate an air stream along the surface of said liquid in said receptacle, an air vortex generating member extending upwardly from said liquid in said receptacle into the path of said air stream being circulated thereover, said vortex generating member including an air diverter section for diverting a portion of said air stream and a substantially C-shaped eye section connecting with said diverter section and adapted to receive said diverted air stream from said diverter section, said C-shaped eye section including an inner annular wall so constructed and arranged as to confine said diverted air stream into a substantially circular path, said inner annular wall being inclined outwardly from the bottom toward the top thereof so that said wall imparts a swirling motion and an upward thrust to said diverted air stream thereby generating a stabilized air vortex flowing generally upwardly from said eye section and having a low pressure region in the center thereof, said eye section communicating with water in said receptacle so that water is drawn into said low pressure region of said air vortex and broken up into small droplets to become entrained in said upwardly flowing air stream.

4. In an air conditioning apparatus utilizing a water spray on a heat exchanger for cooling purposes, the combination comprising a liquid receptacle in said apparatus, means for delivering water to said receptacle, air circulating means in said apparatus arranged to circulate an air stream through said apparatus and so disposed as to circulate at least a portion of said air stream along the surface of said liquid in said recpetacle, a heat exchanger arranged downstream from said liquid receptacle, through which said air stream is circulated, an air vortex generating member including a panel extending upwardly from said water in said receptacle and arranged substantially transversely to said air stream for diverting at least a portion of said air stream, said panel having one end thereof formed into a substantially C-shaped eye section adapted to receive said diverted air stream, said eye section having its inner wall surface inclined outwardly from the bottom thereof to the top so that said wall surface imparts a swirling motion and an upward thrust to said air stream diverted into said eye section, said panel having its edge thereof in said eye section directed toward said heat exchanger so that water is forced to flow around the inner wall surface of said C-shaped eye section by the centrifugal forces created by said swirling air mass therein to be sprayed from said edge of said panel member toward said heat exchanger by said air stream discharging from said eye section.

5. In an air conditioning unit having a refrigeration system including a cooling unit adapted to condense moisture out of an air stream being circulated thereover, the combination comprising a water receptacle, means for collecting water from said cooling unit and for delivering said water to said receptacle, air circulating means adapted to circulate an air stream from the outdoors along the surface of said water in said receptacle, an air vortex generating member extending upwardly from said receptacle into the path of said air stream flowing thereover, said air vortex generating member including an eye section having an inner wall surface so constructed and arranged as to receive a portion of said air stream and to confine said portion of said air stream into a generally circular path about a substantially vertical axis, said wall surface being inclined from the bottom thereof outwardly toward the top to impart an upward thrust to said air stream confined to said circular path within said eye section thereby generating a substantially stabilized air vortex flowing upwardly from said eye section and having a low pressure region communicating with said eye section, and means for introducing water from said receptacle into said eye section so that said water is drawn into said low pressure region of said air vortex and broken up into small droplets by the turbulence of said air vortex to become entrained in said air flowing upwardly from said eye section and thence carried by said outdoor air stream into other portions of said unit.

6. In an air conditioning unit having a refrigeration system including a cooling unit adapted to condense moisture out of an air stream being circulated thereover, the combination comprising a water receptacle, means for collecting water from said cooling unit and delivering said water to said receptacle, a mixed flow fan mounted in said unit and adapted to circulate an air stream from the outdoors through said unit, said mixed flow fan including fan blades arranged to discharge air along the surface of said water in said receptacle, an air vortex generating means extending upwardly from said receptacle into the path of said air stream flowing thereover, said air vortex generating member including an eye section having an inner wall surface so constructed and arranged as to receive a portion of said air stream and to confine said portion of said air stream into a circular path about a substantially vertical axis, said wall surface being inclined outwardly from the bottom thereof toward the top to impart an upward thrust to said air stream confined to said circular path thereby generating a substantially stabilized air vortex flowing upwardly into said unit and having a low pressure region communicating with said eye section, and means for introducing water from said receptacle into said eye section so that said water is drawn into said low pressure region of said air vortex and broken up into small droplets by the turbulence of said air vortex to become entrained in said air flowing upwardly from said eye section and thence carried by said outdoor air stream into other portions of said unit.

7. Apparatus for entraining liquid droplets in an air stream comprising a receptacle having bottom and side walls, adapted to contain a liquid, means for delivering liquid to said receptacle, air circulating means arranged to circulate an air stream over the surface of said liquid in said receptacle, an air vortex generating member arranged in the path of said air stream flowing over said liquid in said receptacle, said air vortex generator including an eye section having a wall abutting said bottom of said receptacle and generating in a substantially spiral-shape about an axis disposed at an acute angle with respect to the bottom of said receptacle, said wall flaring from a small opening at one end of said eye section to a larger opening at the other end thereof, said eye section adapted to receive a portion of said air stream and to impart a swirling motion and thrust to said swirling air stream in the direction of said larger opening thereby generating a stabilized air vortex discharging from said larger opening of said eye section having a low pressure region in the center thereof, said small opening of said eye section communicating with liquid in said receptacle so that liquid is drawn into said eye section by said low pressure region in the center of said air vortex and broken up into small droplets to become entrained in said air discharging from said larger opening of said air vortex generator.

8. In an air conditioning apparatus utilizing a liquid spray on a heat exchange device for cooling purposes, the combination comprising a liquid receptacle having bottom and side walls adapted to contain a liquid, means for delivering liquid to said receptacle, air circulating means arranged to circulate an air stream over the surface of said liquid in said receptacle, a heat exchanger arranged downstream from said liquid in said receptacle through which said air stream circulates, an air vortex generating member arranged in the path of said air stream flowing over said liquid in said receptacle, said air vortex generator including an eye section having a wall abutting said bottom of said receptacle and generating upwardly in a substantially spiral-shape about an axis disposed at an acute angle with respect to the bottom of said receptacle, said wall flaring from a small opening at one end of said eye section communicating with water in said receptacle to a larger opening at the other end thereof, said eye section having a gap therein adapted to receive at least a portion of said air stream and to impart a swirling motion to and a thrust to said portion of said air stream in the direction of said larger opening in said eye section thereby creating a generally stabilized air vortex discharging from said larger opening of said eye section, said air vortex having a low pressure region in the center thereof communicating with said small opening of said eye section for drawing liquid into said eye section and swirling said liquid therein thereby to break said water up into small droplets to become entrained in said air discharging from said larger opening of said air vortex generator.

9. In an air conditioning apparatus utilizing a water spray on a heat exchanger for cooling purposes, the combination comprising a water receptacle having bottom and side walls adapted to contain condensate water formed in said air conditioning apparatus, means for delivering water to said receptacle, air circulating means in said apparatus arranged to circulate an air stream through said apparatus and so disposed as to circulate at least a portion of said air stream along the surface of said liquid in said receptacle, a heat exchanger arranged downstream from said liquid receptacle through which said air stream is circulated, an air vortex generator arranged in the path of said air stream flowing over said liquid in said receptacle, said air vortex generator including a wall member having a front edge engaging said bottom of said receptacle and generating upwardly in a substantially spiral-shape about an axis disposed at an acute angle with respect to the bottom of said receptacle, said wall member flaring from a small opening communicating with water in said receptacle at one end to a larger opening at the other end thereof, said wall member having a rear edge thereof directed downstream from said fan toward said heat exchanger, said wall member adapted to divert at least a portion of said air stream flowing along the surface of said receptacle and to confine said air to a substantially circular path while imparting a thrust thereto in the direction of said larger opening of said vortex generator thereby creating a substantially stabilized air vortex having a low pressure region in the center thereof communicating with said small opening of said generator so that water is drawn into said generator and caused to flow around surface of said wall member and sprayed from said rear edge of said panel member toward said heat exchanger by said air stream discharging from said vortex generator.

References Cited in the file of this patent

UNITED STATES PATENTS

| | | |
|---|---|---|
| 1,423,412 | Garner | July 18, 1922 |
| 1,881,049 | Garner | Oct. 4, 1932 |
| 1,972,398 | Garner | Sept. 4, 1934 |
| 2,335,456 | Seitz | Nov. 30, 1943 |
| 2,417,743 | Eberhart | Mar. 18, 1947 |
| 2,710,510 | Roseman | June 14, 1955 |
| 2,719,411 | Deering | Oct. 4, 1955 |
| 2,941,382 | Wuesthoff | June 21, 1960 |